(12) United States Patent
Cole

(10) Patent No.: US 11,711,104 B2
(45) Date of Patent: Jul. 25, 2023

(54) NOISE MINIMIZATION TO COMMUNICATE WITH A BEACON

(71) Applicant: The Charles Machine Works, Inc., Perry, OK (US)

(72) Inventor: Scott B. Cole, Edmond, OK (US)

(73) Assignee: The Charles Machine Works, Inc., Perry, OK (US)

( * ) Notice: Subject to any disclaimer, the term of this patent is extended or adjusted under 35 U.S.C. 154(b) by 337 days.

(21) Appl. No.: 17/074,851

(22) Filed: Oct. 20, 2020

(65) Prior Publication Data

US 2021/0119656 A1 Apr. 22, 2021

Related U.S. Application Data

(60) Provisional application No. 62/923,784, filed on Oct. 21, 2019.

(51) Int. Cl.
*G01V 3/00* (2006.01)
*H04B 1/12* (2006.01)
*H04B 1/14* (2006.01)
*H04B 17/345* (2015.01)
*H04B 17/27* (2015.01)
(Continued)

(52) U.S. Cl.
CPC ............ *H04B 1/123* (2013.01); *E21B 47/12* (2013.01); *G01V 3/083* (2013.01); *G01V 3/12* (2013.01); *G01V 3/28* (2013.01); *H04B 1/14* (2013.01); *H04B 1/1638* (2013.01); *H04B 17/21* (2015.01); *H04B 17/27* (2015.01); *H04B 17/345* (2015.01); *G01S 13/88* (2013.01); *G01S 13/885* (2013.01)

(58) Field of Classification Search
CPC ........ H04B 1/123; H04B 1/14; H04B 1/1638; H04B 17/21; H04B 17/27; H04B 17/345; H04B 17/102; E21B 47/12; G01V 3/12; G01V 3/083; G01V 3/28; G01S 13/885; G01S 13/88; G01S 13/0209
USPC ................................ 324/323, 327, 332, 376
See application file for complete search history.

(56) References Cited

U.S. PATENT DOCUMENTS 4,542,344 A 9/1985 Darilek et al.
4,742,356 A 5/1988 Kuipers
(Continued)

FOREIGN PATENT DOCUMENTS

DE 19533105 A1 10/1996
EP 1526606 A1 4/2005
(Continued)

*Primary Examiner* — Raul J Rios Russo
(74) *Attorney, Agent, or Firm* — Tomlinson McKinstry, P.C.

(57) ABSTRACT

A method for detecting a beacon signal using an above-ground tracker. The tracker comprises an antenna assembly comprising a plurality of antennas. Each antenna is oriented in a different direction. During operation, if the beacon signal is interrupted due to a local noise source, transmission of the beacon signal is stopped. The tracker then detects radiation from the local noise source and the processor determines a direction from which peak ambient noise arrives at the tracker. The beacon signal is then resumed. A processor included in the tracker excludes any signals generated by the antenna assembly that are representative of radiation that arrived at the tracker from the same direction the peak ambient noise arrived at the tracker. The tracker then detects the beacon signal using the non-excluded signals.

20 Claims, 9 Drawing Sheets

(51) Int. Cl.
   *H04B 17/21* (2015.01)
   *H04B 1/16* (2006.01)
   *E21B 47/12* (2012.01)
   *G01V 3/12* (2006.01)
   *G01V 3/08* (2006.01)
   *G01V 3/28* (2006.01)
   *G01S 13/88* (2006.01)

(56) References Cited

U.S. PATENT DOCUMENTS

| | | |
|---|---|---|
| 5,397,986 A | 3/1995 | Conway et al. |
| 5,640,092 A | 6/1997 | Motazed et al. |
| 5,699,048 A | 12/1997 | Galloway |
| 5,904,210 A | 5/1999 | Stump et al. |
| 6,005,532 A | 12/1999 | Ng |
| 6,035,951 A | 3/2000 | Mercer et al. |
| 6,496,008 B1 | 12/2002 | Brune et al. |
| 6,563,474 B2 | 5/2003 | Nantz et al. |
| 6,640,907 B2 | 11/2003 | Mercer et al. |
| 6,737,867 B2 | 5/2004 | Brune et al. |
| 6,865,455 B1 | 3/2005 | Wiegert |
| 6,882,154 B2 | 4/2005 | Mercer et al. |
| 6,924,767 B2 | 8/2005 | Kitahara et al. |
| 7,009,399 B2 | 3/2006 | Olsson et al. |
| 7,013,990 B1 | 3/2006 | Nickel et al. |
| 7,042,411 B2 | 5/2006 | Yagi et al. |
| 7,786,731 B2 | 8/2010 | Cole et al. |
| 7,952,357 B2 | 5/2011 | Cole |
| 8,264,226 B1 | 9/2012 | Olsson et al. |
| 8,497,684 B2 | 7/2013 | Cole et al. |
| 8,729,901 B2 | 5/2014 | Lam et al. |
| 8,928,323 B2 | 1/2015 | Cole et al. |
| 9,329,297 B2 | 5/2016 | Cole et al. |
| 9,423,503 B2 | 8/2016 | Cole et al. |
| 2002/0105331 A1 | 8/2002 | Brune et al. |
| 2004/0070399 A1 | 4/2004 | Olsson et al. |
| 2005/0023036 A1 | 2/2005 | Cole et al. |
| 2005/0077085 A1 | 4/2005 | Zeller et al. |
| 2006/0254820 A1 | 11/2006 | Cole et al. |
| 2008/0036652 A1 | 4/2008 | Shore et al. |
| 2008/0096489 A1* | 4/2008 | He .................... H04B 1/28 455/75 |
| 2011/0001633 A1 | 1/2011 | Lam et al. |
| 2015/0036731 A1* | 2/2015 | Dark .................. H04L 27/364 375/350 |
| 2020/0294568 A1* | 9/2020 | Wang ................ G11C 11/161 |
| 2022/0109462 A1* | 4/2022 | Fleischer ............ H04B 1/109 |

FOREIGN PATENT DOCUMENTS

| | | |
|---|---|---|
| JP | 2003249816 A1 | 9/2003 |
| WO | 9530913 | 11/1995 |
| WO | 0010456 | 3/2000 |

* cited by examiner

NOISE MINIMIZATION TO COMMUNICATE WITH A BEACON

SUMMARY

The present disclosure is directed to a method of using an underground beacon that transmits a beacon signal. The method comprises the steps of actuating an above-ground tracker that is adapted to receive the beacon signal, and if the beacon signal is active, discontinuing transmission of the beacon signal. The method also comprises the steps of determining a direction from which peak ambient noise arrives at the tracker, starting or resuming transmission of the beacon signal, and receiving electromagnetic radiation at the tracker and generating a set of signals representative of that radiation. The method further comprises the steps of excluding from the signal set those signals that are representative of radiation that arrived at the tracker from the determined direction, thereby producing a modified signal set, and using the modified signal set in detection of the beacon signal.

The present disclosure is also directed to a system comprising a beacon positioned beneath a ground surface and configured to emit a beacon signal, and an above-ground tracker. The above-ground tracker comprises a plurality of antennas and a processor. Each antenna is oriented in a different direction and is configured to receive electromagnetic radiation and generate a set of signals indicative of such radiation. The processor is configured to determine which one or more antennas of the plurality of antennas receive peak ambient noise. The processor is also configured to exclude from the signal set generated by the antennas those signals that are representative of peak ambient noise received at the one or more antennas, thereby creating a modified signal set. The processor is further configured to analyze the beacon signal using the modified signal set.

The present disclosure is further directed to a method of using an underground beacon that transmits a beacon signal. The method comprises the steps of actuating an above-ground tracker having a plurality of antennas adapted to receive the beacon signal, each antenna oriented in a different direction, and if the beacon signal is active, discontinuing transmission of the beacon signal. The method also comprises the steps of determining which one of the plurality of antennas receives peak ambient noise, and starting or resuming transmission of the beacon signal. The method further comprises the step of using electromagnetic radiation received at the plurality of antennas, other than the determined antenna, to detect the beacon signal.

DETAILED DESCRIPTION

Figure 1:
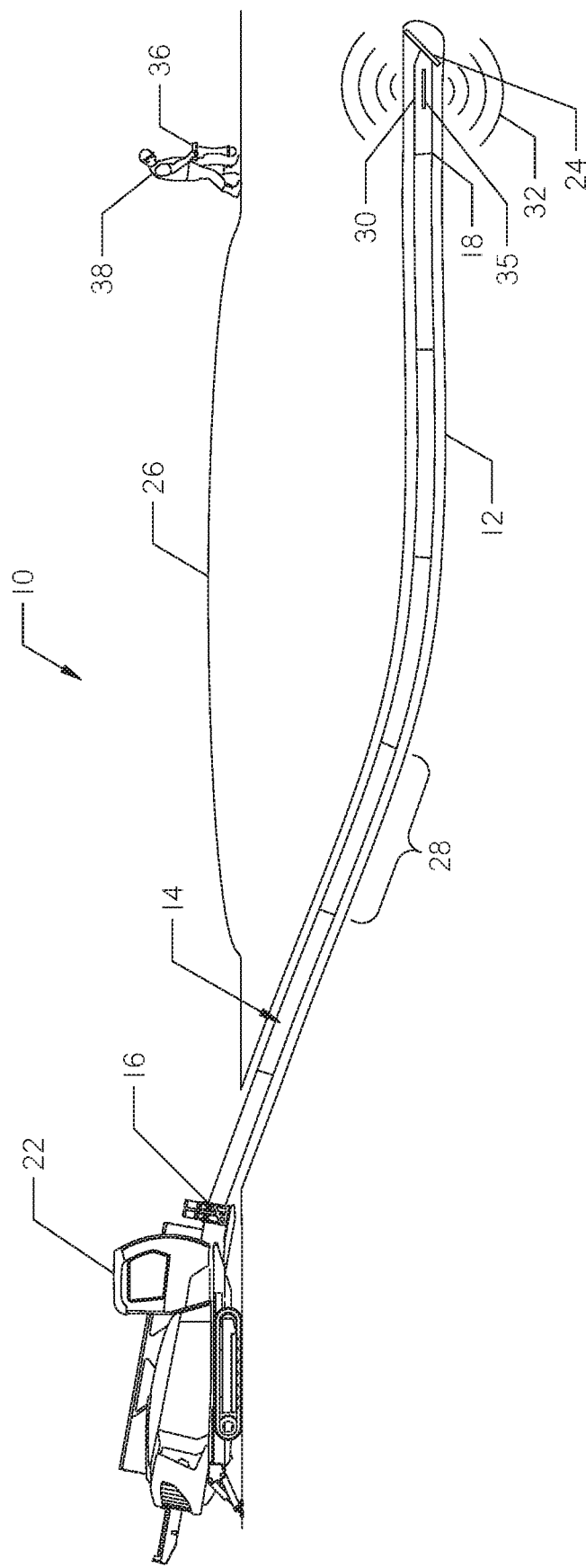
FIG. 1 is a diagrammatic illustration of a horizontal directional drilling system used to drill a borehole.

With reference to FIG. 1, a horizontal directional drilling system 10 is shown. The system 10 is used to create a borehole 12 under an above-ground obstacle, such as a roadway. The system 10 uses a drill string 14 having a first end 16 and a second end 18. The drill string 14 is attached to a drill rig 22 at its first end 16 and a drill bit 24 at its second end 18. The drill rig 22 is supported on a ground surface 26 and is operated by a rig operator. The drill string 14 comprises a plurality of hollow pipe sections 28 arranged in an end-to-end relationship. The drill string 14 functions to transmit thrust and rotation force from the drill rig 22 to the drill bit 24.

Continuing with FIG. 1, a downhole tool 30 is attached to the second end 18 of the drill string 14. The downhole tool 30 carries the drill bit 24 and houses a beacon 32, shown in FIG. 5. The beacon 32 is configured to emit a beacon signal 34 from the downhole tool 30 at a selected frequency. One or more beacon windows 35 may be formed in the downhole tool 30 for the beacon signal 34 to pass through. The beacon signal 34 is preferably a magnetic dipole field.

An above-ground tracker 36, operated by a tracker operator 38, is used to detect and analyze the beacon signal 34 in order to determine the downhole position of the beacon 32. The beacon signal 34 includes information about the beacon 32 as well as the downhole conditions, such as the downhole temperature and fluid pressure. In operation, the tracker operator 38 walks along the planned borepath tracking the beacon signal 34 with the tracker 36.

Figure 2:
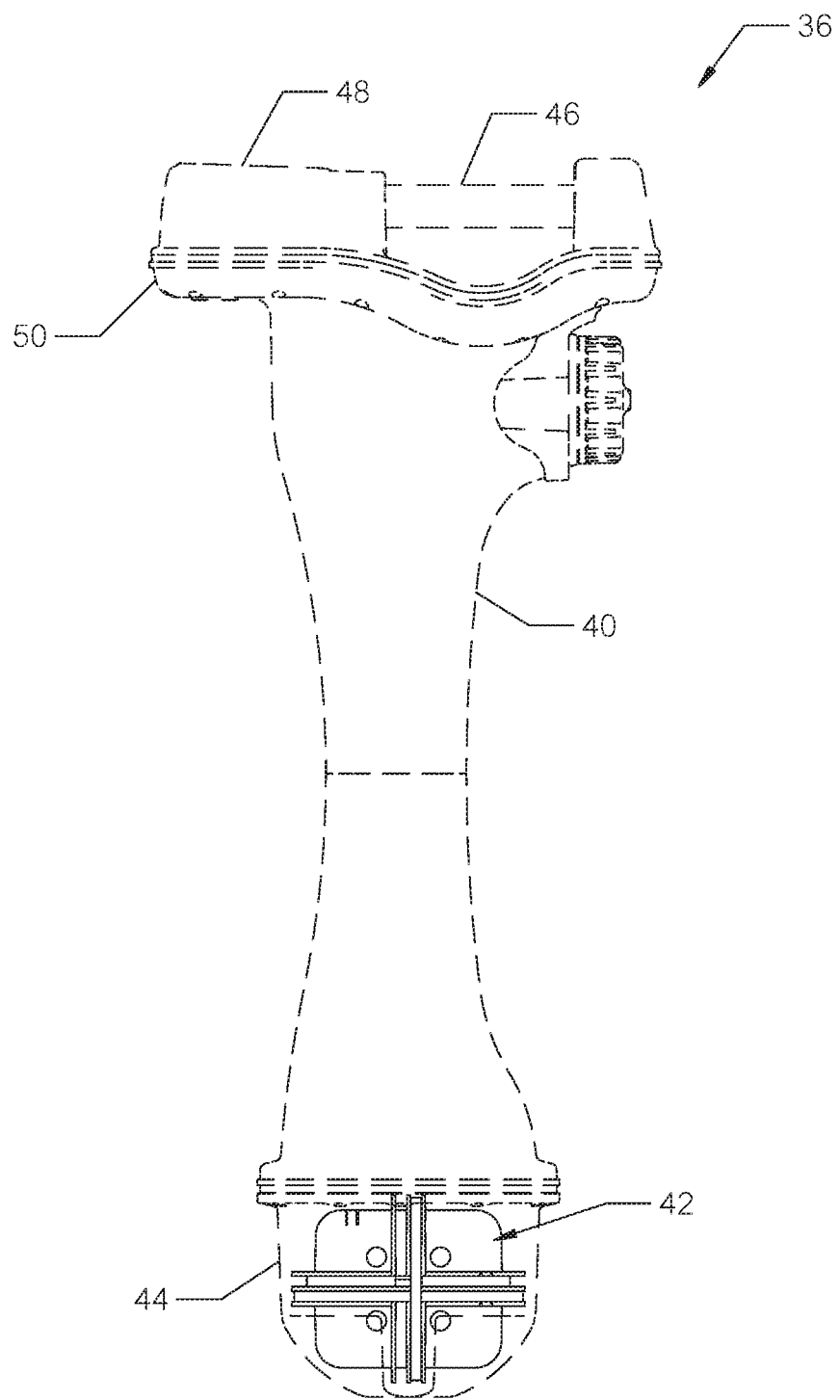
FIG. 2 is an illustration of a hand-held tracker. The tracker is shown in phantom such that an antenna assembly installed within the tracker is visible.

With reference to FIG. 2, one embodiment of the above-ground tracker 36 is shown. The tracker 36 comprises an elongate housing 40 having one or more antenna assemblies 42 disposed therein. The antenna assembly 42 is disposed at the lower end 44 of the housing 40, and a handle 46 and a display 48 are formed at the opposed upper end 50 of the housing 40. Trackers known in the art having other shapes and sizes may also be used in place of the tracker 36 shown in FIG. 2.

Continuing with FIG. 2, the tracker 36 further comprises one or more filters, one or more amplifiers, an A/D converter, and a processor. In operation, the antenna assembly 42 receives electromagnetic radiation and generates a set of signals or voltages representative of that radiation. The set of signals are sent to the filter and amplifier. The filter eliminates noise included in the set of signals by removing any signals that are not tuned to the same frequency as the beacon signal 34, and the amplifier increases the magnitude of the set of signals. From the filter and amplifier, the set of signals are sent to the A/D convertor. The A/D convertor converts the set of signals into digital data and sends the digital data to the processor.

The processor may comprise a digital signal processor (DSP) and a microcontroller. The processor decodes the digital data received from the A/D convertor and performs calculations to determine a location of the beacon 32 relative to the tracker 36. The processor also interprets information transmitted on the beacon signal 34 about the downhole conditions and beacon diagnostics, such as battery status, pitch, and roll. The results of the analyses performed by the processor may be shown on the display 48 for the operator 38.

Figure 3:
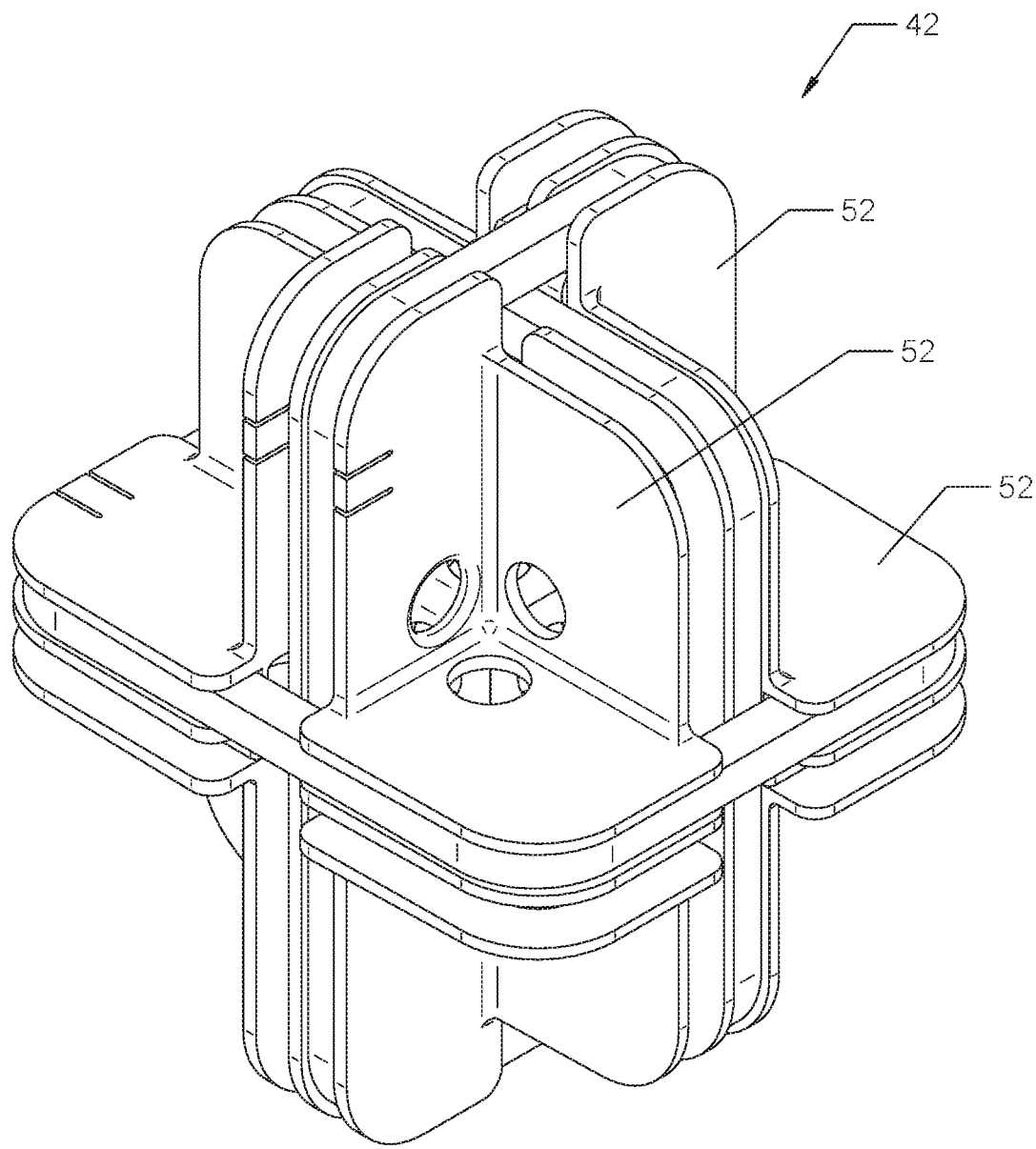
FIG. 3 a perspective view of the antenna assembly shown in FIG. 2.

With reference to FIG. 3, the antenna assembly 42 comprises a plurality of antennas 52. Three orthogonally positioned antennas 52 are included in the embodiment shown in FIG. 3. Each antenna 52 is positioned on a different axis (x, y, and z). That is, each of the three antennas 52 is disposed on a plane which sits at a ninety degree angle to each of the other two antennas 52. Each antenna 52 detects the beacon signal 34 on a different axis. The "z" axis corresponds with the up-down direction of the beacon signal 34, and the "x" and "y" axes correspond to the right-left and forward-backward direction of the beacon signal 34. Other embodiments of the antenna assembly 42 are described in U.S. Pat. No. 9,239,297, authored by Cole et al., the contents of which are incorporated herein by reference.

Figure 4:
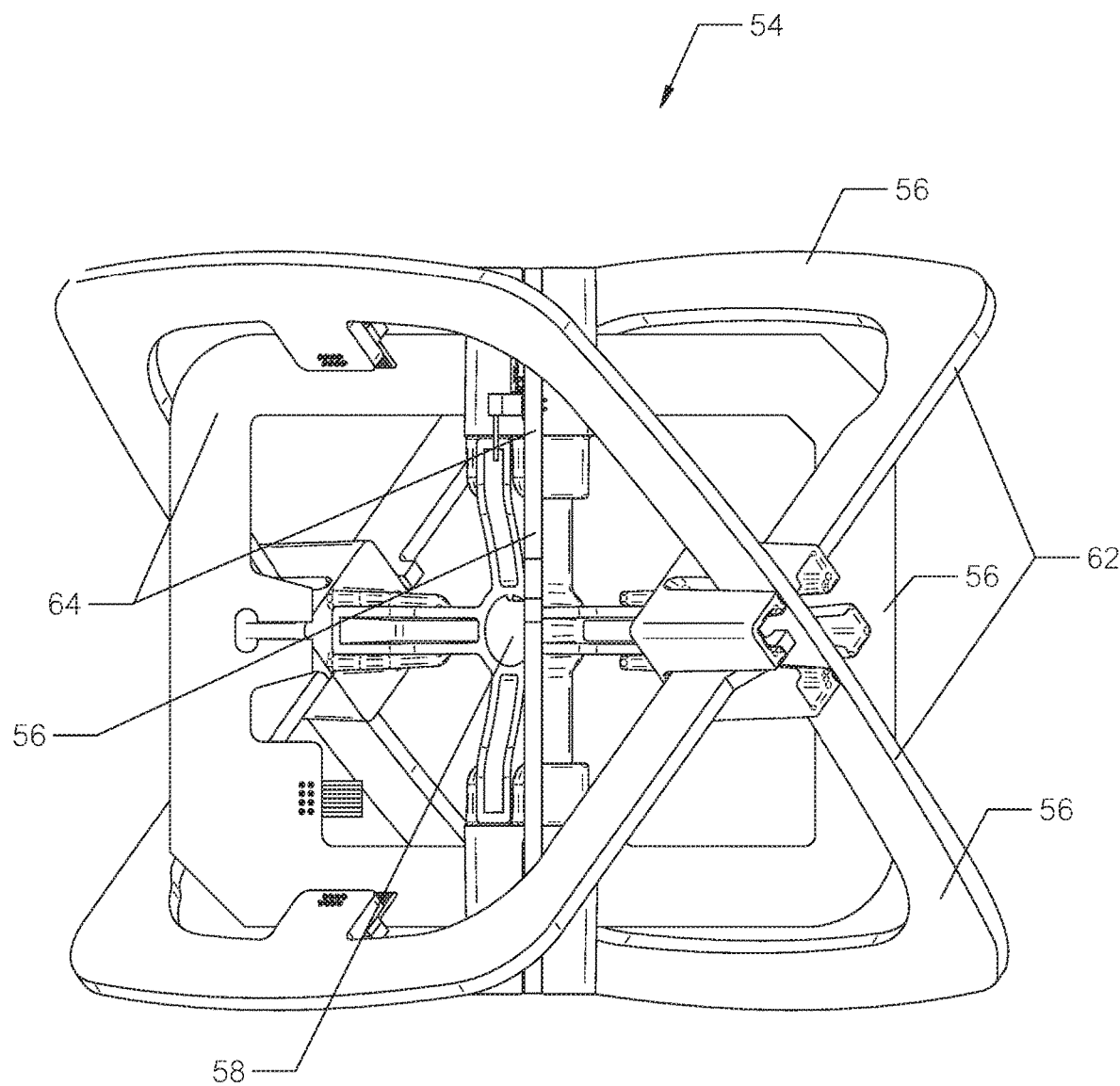
FIG. 4 is a perspective view of another embodiment of an antenna assembly.

With reference to FIG. 4, another embodiment of an antenna assembly 54 is shown. The antenna assembly 54 may be used in the tracker 36 in place of the antenna assembly 42 shown in FIG. 2. The antenna assembly 54 comprises a plurality of antennas 56 having a common center point 58. Four antennas 56 are included in the embodiment shown in FIG. 4. Each antenna 56 is oriented in a different direction and defines a different plane. The antennas 56 shown in FIG. 4 are each oriented at a 45 degree angle relative to a horizontal plane passing through the center point 58. The antennas 56 are grouped into a first pair 62 and a second pair 64.

Rather than detect the beacon signal 34 on three axes, like the antenna assembly 42, the antenna assembly 54 detects the beacon signal 34 by balancing the beacon signal 34 received by the antennas 56. The first pair 62 of antennas 56 detects the forward and backward direction of the beacon signal 34 along the borepath, and the second pair 64 of antennas 56 detects the side-to-side direction of the beacon signal 34. In operation, the operator 38 detects the beacon signal 34 by balancing the signal strength between the antennas 56 of each pair 62 and 64. Other embodiments of the antenna assembly 54 are described in U.S. Patent Publication No. 2020/0142089, authored by Cole et al., the contents of which are incorporated herein by reference.

Figure 5:
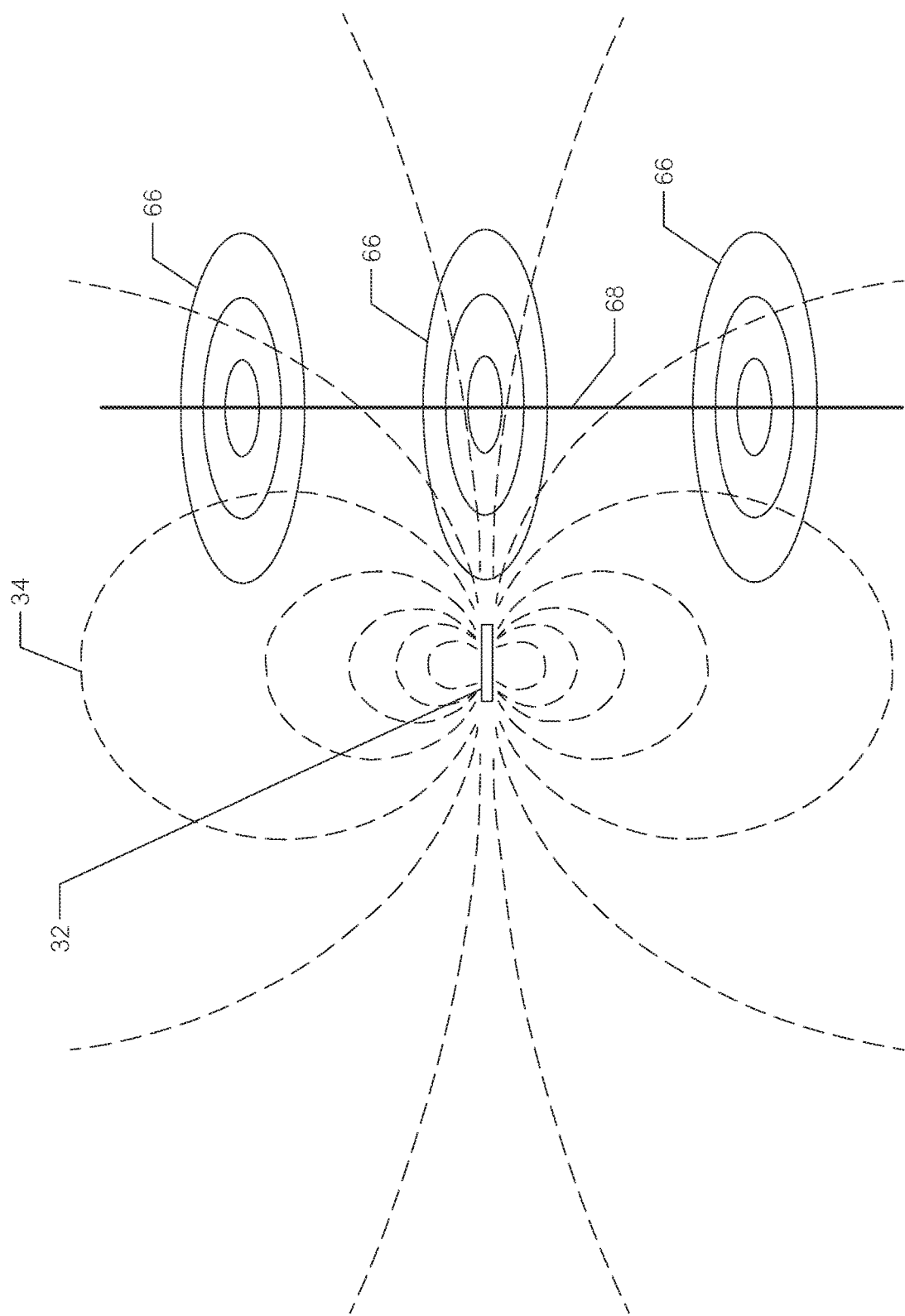
FIG. 5 is an illustration of a beacon signal radiating from an underground beacon adjacent a local noise source. Electromagnetic signals are shown radiating from the local noise source.

During operation, there may be instances where interference or noise from outside sources emitting signals interrupts the beacon signal 34, as shown by the noise signals 66 radiating from a noise source 68 in FIG. 5. The noise source may be an electric utility line, for example. One method of addressing this problem is to analyze the planned borepath for electromagnetic interference. Using such analysis, the operator may select a frequency at which to emit the beacon signal 34 with little or no interference. A borepath analyzer is provided in U.S. Pat. No. 9,971,013, issued to Cole et al., the contents of which are incorporated herein by reference.

Despite selecting a frequency determined to have little or no interference at which to emit the beacon signal 34, an ambient noise source transmitting at the same frequency as the beacon signal 34 may still be encountered while boring. Such noise source can be orders of magnitude higher than the beacon signal 34. Thus, it may be difficult or even impossible to detect the beacon signal 34 in the presence of such noise source, making it difficult to continue boring operations.

Figure 6:
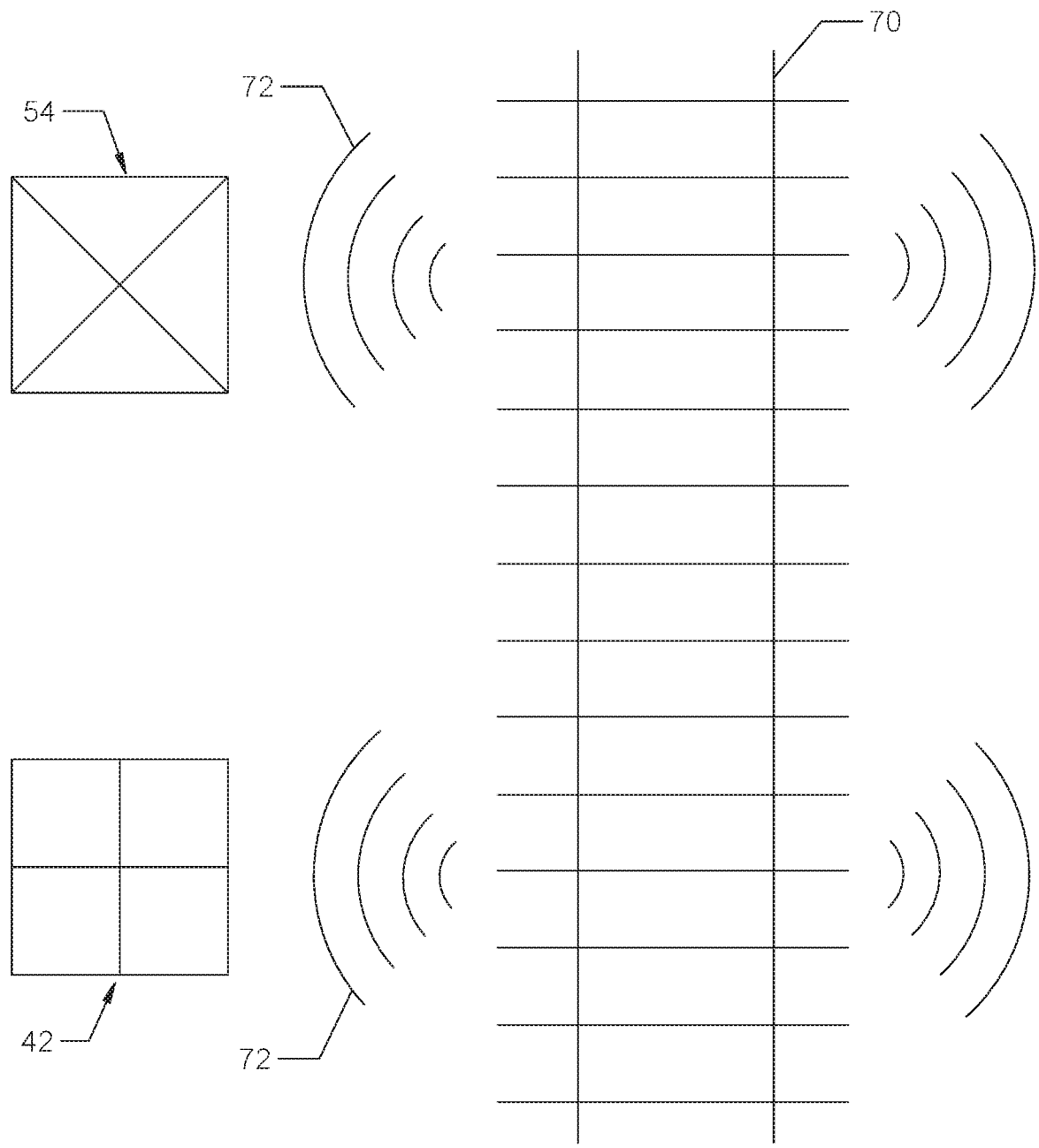
FIG. 6 is an illustration of the antenna assemblies shown in FIGS. 3 and 4 positioned adjacent a railroad track emitting electric signals.

The ambient noise source, however, is often directional in nature. Meaning, any electromagnetic radiation emitted from a noise source may only impinge one area of the antenna assembly 42 or 54. For example, a nearby railroad track 70 may emit electrical signals 72 out away from the sides of the track 70, as shown in FIG. 6. The electrical signals 72 may only impinge those areas of the antenna assembly 42 or 54 that face the railroad track 70. Such areas may receive maximum or peak noise ambient noise signals. In contrast, the non-facing areas of the antenna assembly 42 or 54 should have minimal to zero interference from the electrical signals 72. Therefore, the tracker 36 may be able to detect the beacon signal 34 using the signals generated by those areas of the antenna assembly 42 or 54 not receiving peak ambient noise.

Figure 7:
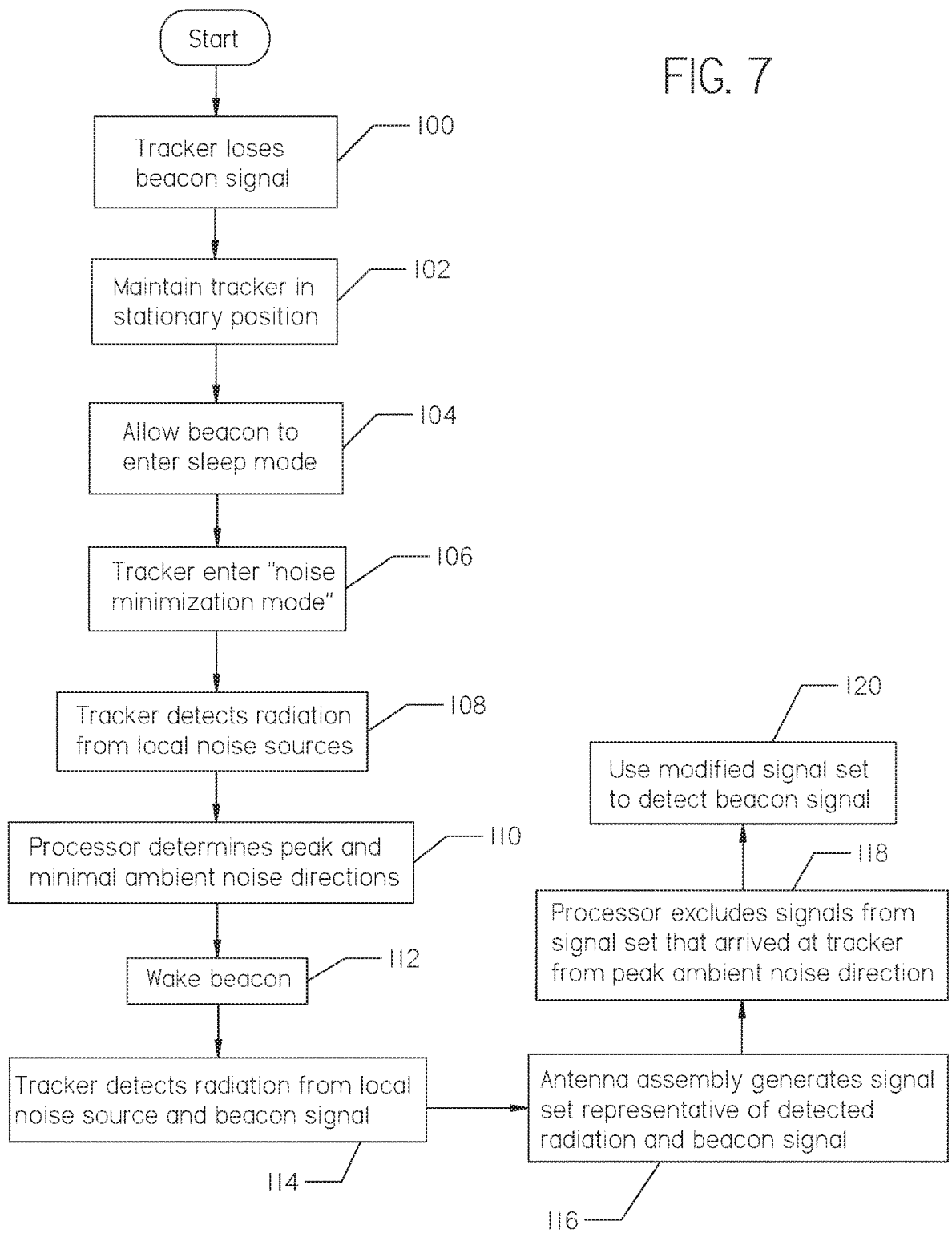
FIG. 7 is a flow chart of a method of detecting a beacon signal.

Turning to FIG. 7, one method of determining what areas of the antenna assembly 42 or 54 receive peak ambient noise and what areas receive minimal ambient noise is shown. To start, the operator 38 tracks the beacon signal 34 until ambient noise causes the tracker 36 to lose the beacon signal 34, as shown by step 100. Following loss of the beacon signal 34, the operator 38 maintains the tracker 36 in a stationary position where the beacon signal 34 was lost, as shown by step 102. The beacon 32 is then allowed to go to sleep, thereby discontinuing transmission of the beacon signal 34, as shown by step 104. Discontinuing transmission of the beacon signal 34 ensures that any radiation subsequently detected by the tracker 36 is from a local noise source. Once transmission of the beacon signal 34 is discontinued, the operator 38 directs the tracker 36 to enter a "noise minimization mode", as shown by step 106. Such mode may be entered upon human input on the tracker's display 48.

Continuing with FIG. 7, in the noise minimization mode, the tracker 36 detects radiation from local noise sources at the same frequency the beacon signal 34 was transmitted, as shown by step 108. Upon detecting ambient noise, the processor will determine a direction from which peak ambient noise arrives at the tracker 36, as shown by step 110. If more than one local noise source is near the tracker 36, the processor may determine one or more directions from which peak ambient noise arrives at the tracker 36. Such one or more directions may be referred to herein as the peak ambient noise direction. The processor will also determine one or more directions from which minimal ambient noise arrives at the tracker 36, as shown by step 110. Such one or more directions may be referred to herein as the minimal ambient noise direction.

The processor may determine the peak ambient noise direction by calculating an angle at which high magnitudes of radiation impinge the antenna assembly 42 or 54. Likewise, the processor may determine the minimal ambient noise direction by calculating an angle at which none or low magnitudes of radiation impinge the antenna assembly 42 or 54.

After the processor determines the peak and minimal noise direction, the beacon 32 may start or resume transmission of the beacon signal 34, as shown by step 112. The antenna assembly 42 or 54 subsequently receives electromagnetic radiation from both the beacon signal 34 and local noise sources, as shown by step 114. The antenna assembly 42 or 54 generates a set of signals indicative of the received radiation, as shown by step 116. The signal set is subsequently transmitted to the processor.

Continuing with FIG. 7, the processor is configured to exclude those signals included in the signal set that are representative of radiation that arrived at the tracker 36 from the peak ambient noise direction, as shown by step 118. By excluding such signals, the processor creates a modified signal set from the set of signals generated by the antenna assembly 42 or 54. The modified signal set is representative of radiation that arrived at the tracker 36 from the minimal ambient noise direction. The processor uses the modified signal set to detect the beacon signal 34, as shown by step 120.

Figure 8:
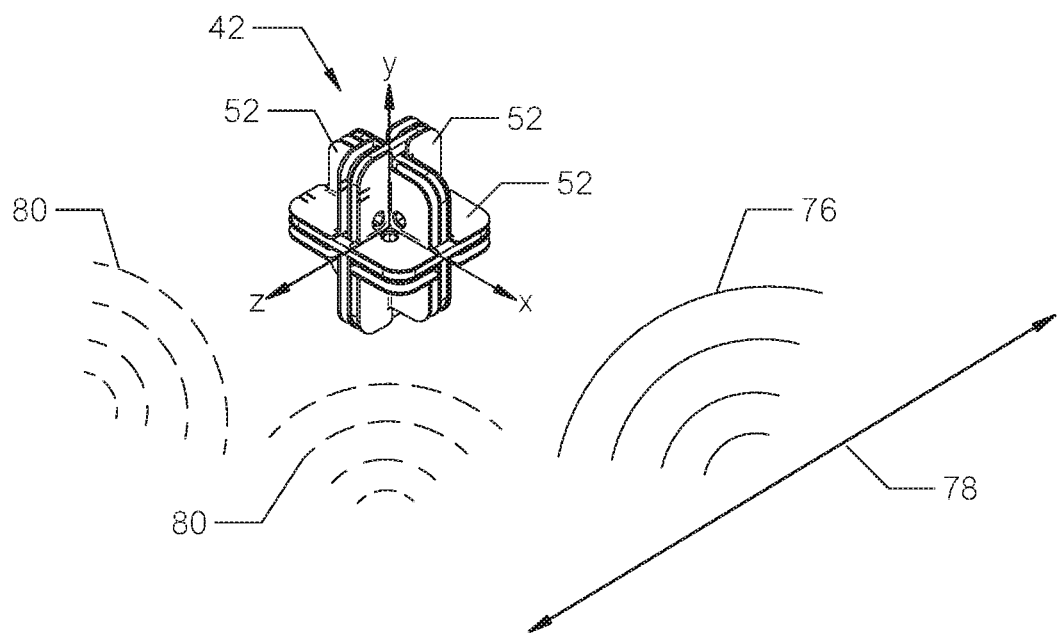
FIG. 8 is a perspective view of the antenna assembly shown in FIG. 3 receiving noise signals from an adjacent noise source.
Figure 9:
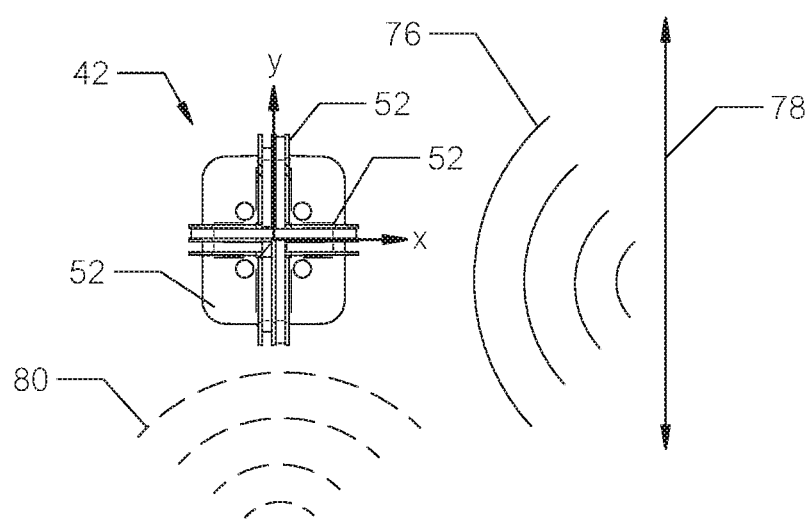
FIG. 9 is a plan view of the antenna assembly and noise source shown in FIG. 8.

Turning to FIGS. 8 and 9, in one embodiment, the processor may exclude signals from the signal set by blocking certain signals from being transmitted to the processor. For example, peak ambient noise signals 76 are shown radiating from a noise source 78 in FIGS. 8 and 9. The peak ambient noise signals 76 are shown primarily impinging the antenna 52 positioned on the x-axis. Minimal ambient noise signals 80 are shown impinging the other antennas 52, positioned on the y and z-axes. In such example, the processor may block all signals generated by the antenna 52 positioned on the x-axis from being transmitted to the processor. Thus, the modified signal set may include only those signals generated by the antennas 52 positioned on the y and z-axes.

Figure 10:
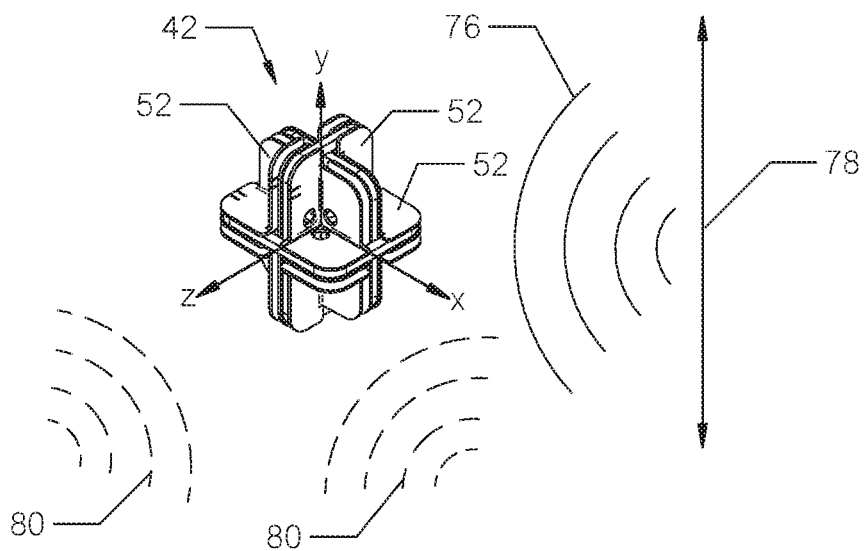
FIG. 10 is the perspective view of the antenna assembly and noise source shown in FIG. 8, but the antenna assembly has been slightly rotated.
Figure 11:
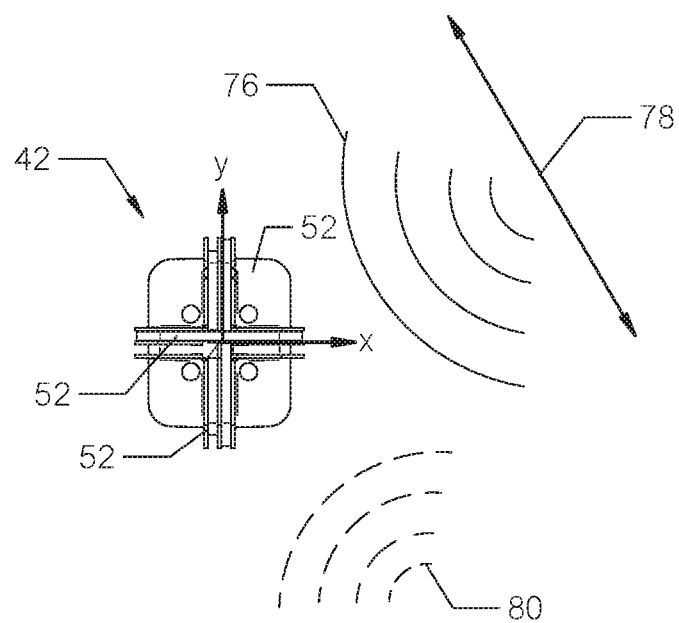
FIG. 11 is a plan view of the antenna assembly and noise source shown in FIG. 10.

Turning to FIGS. 10 and 11, in another embodiment, the processor may exclude signals from the signal set by removing certain signals transmitted to the processor from the signal set. In FIGS. 10 and 11, the antenna assembly 42 is rotated from its position shown in FIGS. 8 and 9, such that the peak ambient noise signals 76 are impinging antennas 52 positioned on both the y and the x-axes. None of the antennas 52 making up the antenna assembly 42 is directly aligned with the direction the peak ambient noise signals 76 are radiating from. Because the processor cannot easily determine which antennas 52 are receiving peak ambient noise, all signals generated by the antenna assembly 42 are transmitted to the processor. The processor then analyzes the received signals to determine which antenna or antennas 52 are receiving peak ambient noise.

The processor determines which antenna or antennas 52 are receiving peak ambient noise using a 3D rotation matrix calculation. Such calculation allows the processor to identify the angle at which the peak and minimal noise signals 76 and 80 are received by each antenna 52. Once the processor determines which antenna or antennas 52 are receiving peak ambient noise, the processor removes all signals from such antenna or antennas 52 from the set of signals, thereby creating the modified signal set. Thus, the processor only analyzes signals received by an antenna or antennas 52 identified by the processor as receiving minimal noise signals 80. Such method is preferably used with the antenna assembly 54, which will likely receive peak ambient noise on more than one antenna 56.

Following detection of the beacon signal 34 using the above method, the operator 38 may continue to track the beacon signal 34 along the borepath. The above method may be repeated, as needed, during operation.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A method of using an underground beacon that transmits a beacon signal, comprising:
   actuating an above-ground tracker that is adapted to receive the beacon signal;
   if the beacon signal is active, discontinuing transmission of the beacon signal;
   thereafter, determining a direction from which peak ambient noise arrives at the above-ground tracker;
   thereafter, starting or resuming transmission of the beacon signal;
   thereafter, receiving electromagnetic radiation at the above-ground tracker and generating a set of signals representative of that radiation;
   excluding from the signal set those signals that are representative of radiation that arrived at the above-ground tracker from the determined direction, thereby producing a modified signal set; and
   using the modified signal set in detection of the beacon signal.

2. The method of claim 1, in which the beacon signal is a magnetic dipole field.

3. The method of claim 1, in which the above-ground tracker contains a plurality of antennas, each antenna oriented in a different direction, and in which the exclusion step is carried out by blocking the output of an antenna oriented in a direction that matches the determined direction.

4. The method of claim 1, in which the above-ground tracker contains a plurality of antennas, each antenna oriented in a different direction, and in which the exclusion step is carried out by removing signals from the signal set that are received by one or more antennas of the plurality of antennas in a direction that matches the determined direction.

5. The method of claim 1 in which the direction is characterized as the first direction and further comprising:
   before starting or resuming transmission of the beacon signal, determining one or more second directions from which minimal to zero ambient noise arrives at the above-ground tracker;
   in which the modified signal set is representative of radiation that arrived at the above-ground tracker in the one or more second directions.

6. A system comprising:
   a beacon positioned beneath a ground surface and configured to emit a beacon signal;
   an above-ground tracker comprising:
      a plurality of antennas, each antenna oriented in a different direction and configured to receive electromagnetic radiation and generate a set of signals indicative of the received electromagnetic radiation; and
      a processor configured to determine which one or more of the plurality of antennas receives peak ambient noise, exclude from the generated set of signals those signals that are representative of peak ambient noise received at the one or more antennas, thereby creating a modified signal set, and analyze the beacon signal using the modified signal set.

7. The system of claim 6, in which the beacon signal is a magnetic dipole field.

8. The system of claim 6, in which the peak ambient noise comprises signals radiating from a local noise source.

9. The system of claim 6, in which each antenna is orthogonal to each other antenna.

10. The system of claim 6, in which the plurality of antennas have a common center point and each antenna is positioned on a different plane.

11. The system of claim 6, in which the processor is configured to exclude signals that are representative of the peak ambient noise by blocking the output of the one or more antennas receiving the peak ambient noise.

12. The system of claim 6, in which the processor is configured to exclude signals that are representative of the peak ambient noise by removing signals from the set of signals that were generated by the one or more antennas receiving the peak ambient noise.

13. The system of claim 6, in which the processor is configured to identify which one or more antennas are receiving peak ambient noise by calculating an angle at which peak ambient noise impinges one or more of the plurality of antennas.

14. The system of claim 6, in which the one or more antennas is characterized as the first one or more antennas, and the processor is further configured to determine which second one or more antennas of the plurality of antennas receives minimal to zero ambient noise, and in which the modified signal set is representative of radiation received at the second one or more antennas.

15. The system of claim 6, further comprising:
a horizontal boring machine supported on a ground surface;
a drill string having a first end and an opposed second end and comprising a plurality of pipe section disposed in end-to-end engagement, in which the first end of the drill string is attached to the boring machine; and
a downhole tool attached to the second end of the drill string, in which the beacon is disposed within the downhole tool.

16. A method of using an underground beacon that transmits a beacon signal, comprising:
actuating an above-ground tracker having a plurality of antennas adapted to receive the beacon signal, each antenna oriented in a different direction;
if the beacon signal is active, discontinuing transmission of the beacon signal;
thereafter, determining which one of the plurality of antennas receives peak ambient noise;
thereafter, starting or resuming transmission of the beacon signal; and
thereafter, using electromagnetic radiation received at the plurality of antennas, other than the determined antenna, to detect the beacon signal.

17. The method of claim 16, in which the beacon signal is a magnetic dipole field.

18. The method of claim 16, further comprising:
blocking a signal output of the determined antenna.

19. The method of claim 16, further comprising:
determining which antenna of the tri-axial antenna assembly receives minimal to zero ambient noise; in which the electromagnetic radiation received at the plurality of antennas used to detect the beacon signal is received by those antennas that received minimal to zero ambient noise.

20. The method of claim 16, further comprising:
transmitting information about one or more downhole conditions and beacon diagnostics on the beacon signal.

* * * * *